(12) United States Patent
Yoon et al.

(10) Patent No.: US 11,121,380 B2
(45) Date of Patent: Sep. 14, 2021

(54) FUEL CELL STACK

(71) Applicants: HYUNDAI MOTOR COMPANY, Seoul (KR); KIA MOTORS CORPORATION, Seoul (KR)

(72) Inventors: Dae Il Yoon, Yongin-si (KR); Yoo Chang Yang, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 130 days.

(21) Appl. No.: 16/516,552

(22) Filed: Jul. 19, 2019

(65) Prior Publication Data

US 2020/0185729 A1 Jun. 11, 2020

(30) Foreign Application Priority Data

Dec. 10, 2018 (KR) .................. 10-2018-0158661

(51) Int. Cl.
*H01M 8/0208* (2016.01)
*C25D 9/10* (2006.01)
*H01M 8/0228* (2016.01)
*H01M 8/1004* (2016.01)
*H01M 8/0258* (2016.01)
*H01M 8/0232* (2016.01)
(Continued)

(52) U.S. Cl.
CPC .......... *H01M 8/0208* (2013.01); *C22C 38/00* (2013.01); *C25D 9/10* (2013.01); *H01M 8/0228* (2013.01); *H01M 8/0232* (2013.01); *H01M 8/0258* (2013.01); *H01M 8/1004* (2013.01); *H01M 8/2465* (2013.01)

(58) Field of Classification Search
CPC .. H01M 8/021; H01M 8/0208; H01M 8/0228; H01M 8/0232; H01M 8/0258; H01M 8/1004
See application file for complete search history.

(56) References Cited

U.S. PATENT DOCUMENTS 10,511,030 B2 * 12/2019 Hsu .................. C22C 13/00
2006/0141333 A1 * 6/2006 Park .................. H01M 8/021
429/514

(Continued)

FOREIGN PATENT DOCUMENTS

JP 2966595 B2 10/1999
JP 4996864 B2 8/2012
JP 5204182 B2 6/2013

*Primary Examiner* — Matthew J Merkling
(74) *Attorney, Agent, or Firm* — Morgan, Lewis & Bockius LLP (57) ABSTRACT

The present disclosure relates to a fuel cell stack having a cathode-side separator and an anode-side separator which are made of different materials to prevent performance degradation of stacks and corrosion and damage of components. A fuel cell stack according to exemplary embodiments of the present disclosure may have multiple unit cells stacked therein, in which each unit cell of the multiple unit cells may include: a membrane electrode assembly (MEA); a pair of gas diffusion layers (GDLs) disposed on opposite surfaces of the MEA; and an anode-side separator and a cathode-side separator disposed to face each other, the MEA and the pair of GDLs being disposed therebetween, in which the cathode-side separator has a corrosion resistance higher than a corrosion resistance of the anode-side separator.

6 Claims, 8 Drawing Sheets

(51) Int. Cl.
    *H01M 8/2465*    (2016.01)
    *C22C 38/00*     (2006.01)

(56) References Cited

U.S. PATENT DOCUMENTS

| | | | | |
|---|---|---|---|---|
| 2006/0285993 | A1* | 12/2006 | Rakowski | H01M 8/021   420/70 |
| 2006/0286432 | A1* | 12/2006 | Rakowski | H01M 8/0206   429/442 |
| 2008/0233456 | A1* | 9/2008 | Ishikawa | C22C 38/04   429/492 |
| 2009/0159602 | A1* | 6/2009 | Hatano | C22C 38/44   220/581 |
| 2011/0008714 | A1* | 1/2011 | Abd Elhamid | H01M 8/021   429/518 |
| 2020/0185729 | A1* | 6/2020 | Yoon | H01M 8/241 |

* cited by examiner

FUEL CELL STACK

CROSS REFERENCE TO RELATED APPLICATION

The present application claims the benefit of priority to Korean Patent Application No. 10-2018-0158661, filed on Dec. 10, 2018, the entire contents of which is incorporated herein for all purposes by this reference.

TECHNICAL FIELD

The present disclosure generally relates to a fuel cell stack. More particularly, the present disclosure relates to a fuel cell stack having a cathode-side separator and an anode-side separator which are made of different materials to prevent performance degradation of stacks and corrosion and damage of components.

BACKGROUND

A fuel cell refers to a generator that converts chemical energy of a fuel into electrical energy through an electrochemical reaction. Fuel cells are used not only to supply driving power for industrial purposes, household purposes, and vehicles, but also to power small electronic products such as portable devices. Recently, the application for fuel cells has been gradually expanded to a highly efficient and clean energy source.

Figure 1:
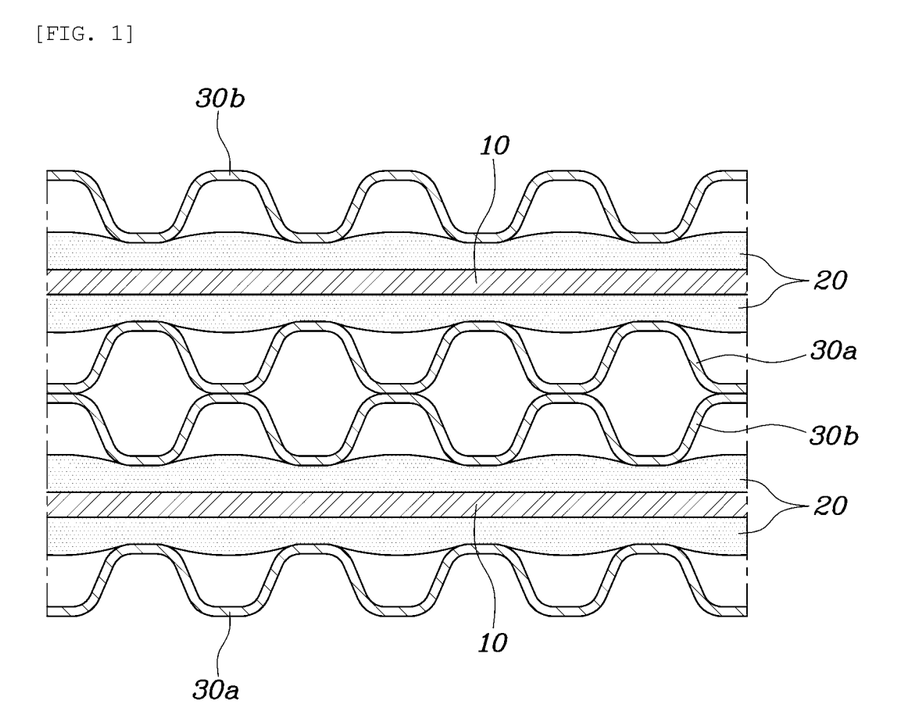
FIGS. 1 and 2 are views each illustrating a configuration of a fuel cell stack having unit cells stacked therein according to the related art.
Figure 2:
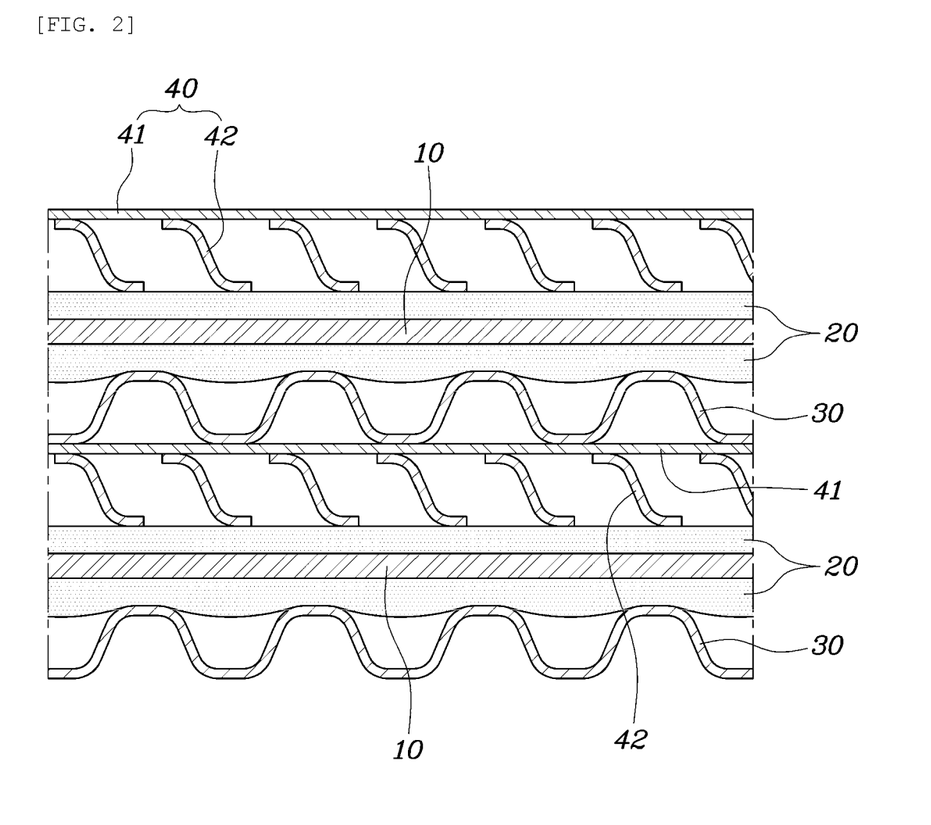

FIGS. 1 and 2 are views each illustrating a configuration of a conventional fuel cell stack in which unit cells are stacked according to the related art. As illustrated in FIGS. 1 and 2, a conventional fuel cell stack is configured such that multiple unit cells are stacked.

Each unit cell is configured such that a membrane electrode assembly (MEA) 10 is disposed at the innermost position. The MEA 10 is configured with a proton-exchange membrane (PEM) allowing protons to pass therethrough, and catalyst layers, i.e., an anode and a cathode, provided on opposite surfaces of the PEM.

In addition, a pair of gas diffusion layers (GDLs) 20 is stacked on one surface and the opposite surface of the MEA 10, respectively, i.e., the outside portions where the cathode and the anode are located, and serves to facilitate diffusion of fuel gas and product water. A pair of separators 30a and 30b, and 30 and 40 is disposed on outer surfaces of the GDLs 20 and serves to guide flow of the fuel gas and coolant and provide a path for discharging the product water.

A pair of separators includes an anode-side separator 30a and 30 disposed on the anode and a cathode-side separator 30b and 40 disposed on the cathode.

Here, as illustrated in FIGS. 1 and 2, the anode-side separator 30a and 30 may be configured such that multiple channels are provided to guide the flow of the fuel gas and the coolant.

On the other hand, a cathode-side separator 30b may be used for a unit cell, which has the same shape with an anode-side separator 30a, as illustrated in FIG. 1. Alternatively, as illustrated in FIG. 2, a cathode-side separator 40 may be applied, which is configured with porous bodies 42 disposed toward the GDL 20 and through which air flows, and a flat plate 41 supporting the porous bodies 42.

Since multiple unit cells are stacked to configure one fuel cell stack, the anode-side separator 30a and 30 of any one unit cell is arranged and stacked to face the cathode-side separator 30b and 40 of an adjacent unit cell, as illustrated in FIGS. 1 and 2.

Accordingly, in order to effectively perform stacking of unit cells and maintain an alignment of the unit cells, the unit cells are stacked by integrating the anode-side separator 30a and 30 and the cathode-side separator 30b and 40 of adjacent unit cells arranged to face each other.

Thus, generally, the anode-side separator 30a and 30 and the cathode-side separator 30b and 40 are formed using materials having the same physical properties.

However, when the anode-side separator 30a and 30 and the cathode-side separator 30b and 40 are made of a single material having a high thermal expansion coefficient, physical and chemical damage of the MEA 10 and the GDLs 20 is accelerated due to the high pressure of the contact face in the stack caused by temperature rise during operation of the fuel cell.

Conversely, when the anode-side separator 30a and 30 and the cathode-side separator 30b and 40 are made of a single material having a low thermal expansion coefficient, the performance of the stack is degraded due to low pressure of the contact face.

Meanwhile, product water is inevitably produced due to the operation of the fuel cell, and a problem arises that a metal separator is corroded by product water.

Therefore, various techniques have been proposed and applied to improve corrosion resistance of separators.

However, a fuel cell has completely different operating environments for an anode side and a cathode side with respect to the MEA. For example, product water is produced by the operation of the fuel cell, and the product water is discharged through the cathode side. In addition, the fuel cell is configured such that hydrogen is supplied to the anode side and oxygen is supplied to the cathode side. Thus, the atmosphere of the cathode side is more acidic than that of the anode side. For this reason, the cathode-side separator is required to have a relatively high corrosion resistance compared with the anode-side separator.

The foregoing is intended merely to aid in the understanding of the background of the present disclosure, and is not intended to mean that the present disclosure falls within the purview of the related art that is already known to those skilled in the art.

The information disclosed in this Background of the Invention section is only for enhancement of understanding of the general background of the invention and may not be taken as an acknowledgement or any form of suggestion that this information forms the prior art already known to a person skilled in the art.

SUMMARY

Various aspects of the present disclosure is directed to providing a fuel cell stack having a cathode-side separator and an anode-side separator which are made of different materials to prevent performance degradation of stacks and corrosion and damage of components.

In order to achieve the above objective, a fuel cell stack having multiple unit cells stacked therein is provided. According to exemplary embodiments of the present disclosure, each unit cell of the multiple unit cells may include: a membrane electrode assembly (MEA); a pair of gas diffusion layers (GDLs) disposed on opposite surfaces of the MEA; and an anode-side separator and a cathode-side separator disposed to face each other, the MEA and the pair of GDLs being disposed therebetween. The cathode-side separator may have a corrosion resistance higher than a corrosion resistance of the anode-side separator.

Each unit cell of the multiple unit cells may include the anode-side separator and the cathode-side separator having different corrosion resistances from each other, and a metal constituting the cathode-side separator may have a corrosion resistance higher than a metal constituting the anode-side separator.

Each unit cell of the multiple unit cells may include the anode-side separator and the cathode-side separator having different corrosion resistances from each other, and the anode-side separator may have a thermal expansion coefficient greater than a thermal expansion coefficient of the cathode-side separator.

Each unit cell of the multiple unit cells may include the anode-side separator and the cathode-side separator having different corrosion resistances each other, and the anode-side separator may include austenitic stainless steel and the cathode-side separator may include ferritic stainless steel.

Each unit cell of the multiple unit cells may include the anode-side separator and the cathode-side separator having different corrosion resistances each other, and the anode-side separator may include aluminum or aluminum alloy and the cathode-side separator may include titanium or titanium alloy.

The number of unit cells that include the anode-side separator and the cathode-side separator having different corrosion resistances from each other may be less than or equal to 10% of an entire number of the multiple unit cells.

The anode-side separator may be configured with multiple channels guiding flows of fuel gas and coolant, and the cathode-side separator may be configured with multiple channels guiding flows of air and the coolant.

The anode-side separator may be configured with multiple channels guiding flows of fuel gas and coolant. The cathode-side separator may be configured with porous bodies disposed toward the GDLs and a flat plate supporting the porous bodies. The porous bodies and flat plate of the cathode-side separator may be configured to have multiple channels through which air flows, and the porous bodies and the flat plate may include a same material.

According to exemplary embodiments of the present disclosure, in consideration of characteristics of a fuel cell stack having different operating environments for an anode side and a cathode side, a cathode-side separator and an anode-side separator are prepared using metals having different corrosion resistance and thermal expansion coefficients. Then, the cathode-side separator and the anode-side separator prepared above are applied to each unit cell, and unit cells are stacked such that cathode-side separators and anode-side separators alternate with each other due to unit cells adjacent to each other. Accordingly, degradation of stack performance and corrosion and damage of components can be minimized.

In particular, the cathode-side separator is prepared using a metal having excellent corrosion resistance compared with the anode-side separator, and the anode-side separator is prepared using a metal having a thermal expansion coefficient greater than that of the cathode-side separator. Accordingly, pressure of the contact face can be maintained an appropriate level during operation of the fuel cell by the characteristics of the anode-side separator, thereby preventing damage to a membrane electrode assembly and a gas diffusion layer. Thus, stack performance degradation can be minimized and corrosion of the cathode-side separator can be prevented.

BRIEF DESCRIPTION OF THE DRAWINGS

The fuel cell stack of the present disclosure have other features and other advantages of the present disclosure which will be apparent from or set forth in more detail in the following detailed description and the accompanying drawings, which together serve to explain certain principles of the present disclosure. The accompanying drawings are as follows.

It may be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Hereinbelow, exemplary embodiments of the present disclosure will be described in detail with reference to the accompanying drawings. While the present disclosure will be described in conjunction with exemplary embodiments thereof, it is to be understood that the present description is not intended to limit the present disclosure to those exemplary embodiments. On the contrary, the present disclosure is intended to cover not only the exemplary embodiments, but also various alternatives, modifications, equivalents, and other embodiments that may be included within the spirit and scope of the present disclosure as defined by the appended claims. Throughout the drawings, the same reference numerals will refer to the same or like parts.

Figure 3:
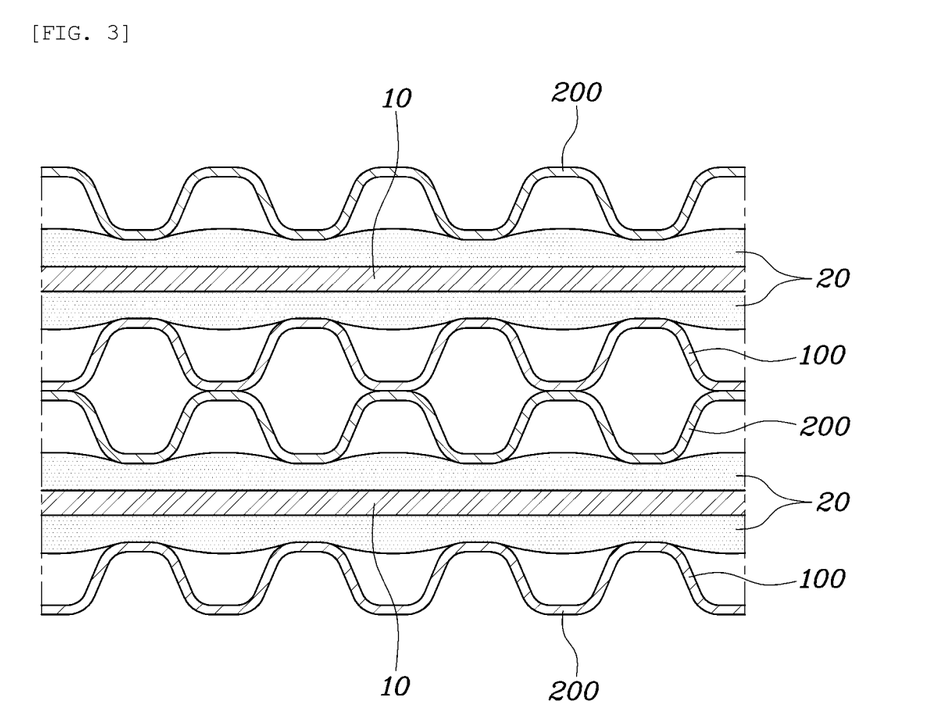
FIGS. 3 and 4 are views each illustrating a configuration of a fuel cell stack having unit cells stacked therein according to exemplary embodiments of the present disclosure.
Figure 4:
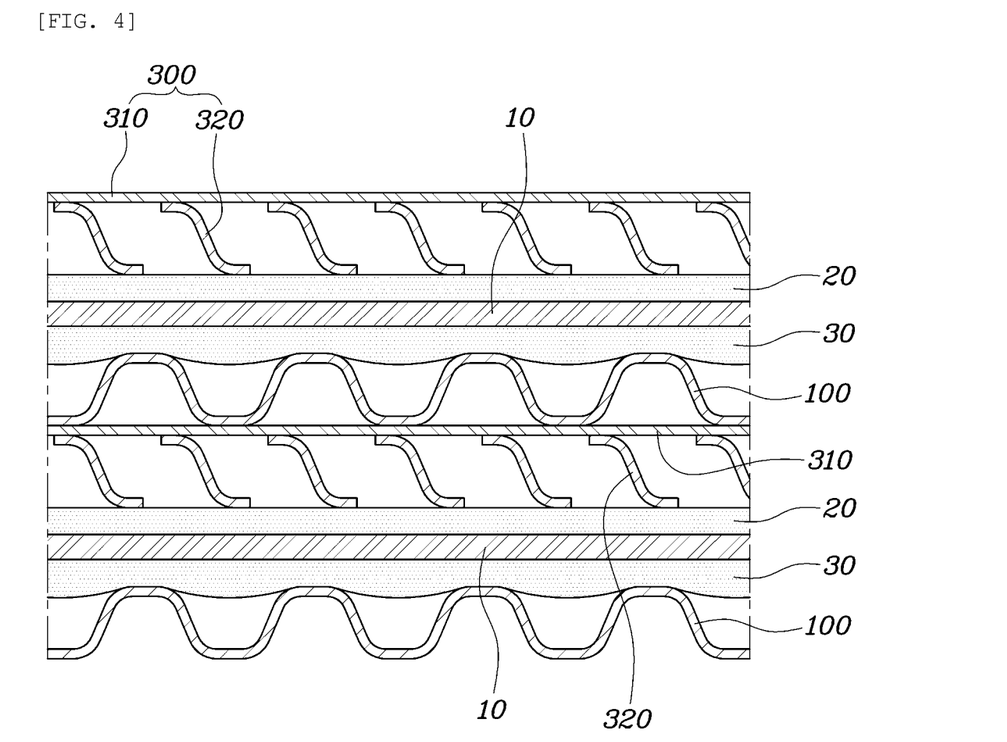

FIGS. 3 and 4 are views each illustrating a configuration of a fuel cell stack in which unit cells are stacked according to exemplary embodiments of the present disclosure.

As illustrated in FIG. 3, a fuel cell stack according to an exemplary embodiment of the present disclosure is configured such that multiple unit cells are stacked.

Each unit cell includes: a membrane electrode assembly (MEA) 10; a pair of gas diffusion layers (GDLs) 20 disposed on opposite surfaces of the MEA 10; an anode-side separator 100 and a cathode-side separator 200 that are disposed to face each other between the MEA 10 and the pair of GDLs 20.

The MEA 10 is implemented as a general MEA which is configured with a proton-exchange membrane (PEM) allowing protons to pass therethrough, and catalyst layers, i.e., a cathode and an anode, provided on opposite surfaces of the PEM.

The pair of GDLs 20 serves to diffuse fuel gas and air flowing through the anode-side separator 100 and the cathode-side separator 200 to the MEA 10 and facilitate flow of product water.

The anode-side separator 100 is disposed to come into contact with a GDL 20 of a region where the anode is disposed (hereinafter, referred to as 'anode side') to guide the flow of the fuel gas. As illustrated in FIG. 3, the anode-side separator 100 is configured with multiple channels 105 guiding the flow of the fuel gas. Here, a flow of coolant is guided to flow to the opposite side of the flow of the fuel gas.

The cathode-side separator 200 is disposed to come into contact with a GDL 20 of a region where the cathode is disposed (hereinafter, referred to as 'cathode region') to guide the flow of air reacting with the fuel gas. Like the anode-side separator 100, the cathode-side separator 200 is configured with multiple channels 205 guiding flow of air and providing a path for discharging the product water. Here, the flow of the coolant is guided to flow to the opposite side of the flow of air.

Meanwhile, since multiple unit cells are stacked to configured one fuel cell stack, the anode-side separator 100 of any one unit cell is arranged and stacked to face the cathode-side separator 200 of an adjacent unit cell, as illustrated in FIG. 3.

This exemplary embodiment has been proposed to improve corrosion resistance and minimize performance degradation of the fuel cell stack. Accordingly, in consideration of characteristics of the fuel cell stack having different operating environments for the anode side and the cathode side with respect to the MEA 10, the anode-side separator 100 and the cathode-side separator 200 are made of different materials. In addition, at least the cathode-side separators 200 constituting unit cells disposed in opposite end portions of stacked unit cells, i.e., unit cells disposed adjacent to end plates (not illustrated) disposed at opposite ends of the fuel cell stack, are required to have excellent corrosion resistance compared with anode-side separators 100 constituting the same. Accordingly, in this exemplary embodiment, a metal constituting the cathode-side separator 200 has excellent corrosion resistance compared with a metal constituting the anode-side separator 100.

In addition, in this exemplary embodiment, at least the anode-side separators 100 constituting unit cells disposed in the opposite end portions of the stacked unit cells are required to have a thermal expansion coefficient greater than the cathode-side separator 200 constituting the same. Accordingly, in this exemplary embodiment, the metal constituting the anode-side separator 100 has a thermal expansion coefficient greater than the metal constituting the cathode-side separator 200.

For example, a unit cell in which the separators of different materials are used is configured such that the anode-side separator 100 is formed of austenitic stainless steel (300 series stainless steel) having a relatively great thermal expansion coefficient and the cathode-side separator 200 is formed of ferritic stainless steel (400 series stainless steel) having relatively excellent corrosion resistance. In addition, the unit cell in which the separators of different materials are used is configured such that the anode-side separator 100 is formed of aluminum or aluminum alloy and the cathode-side separator 200 is formed of titanium or titanium alloy.

Here, surfaces of the anode-side separator 100 and the cathode-side separator 200 may be coated with an element having excellent conductivity to obtain conductivity of the anode-side separator 100 and the cathode-side separator 200. For example, the surfaces of the anode-side separator 100 and the cathode-side separator 200 are coated with an element such as gold (Au) and carbon.

Meanwhile, the separators of different materials may be applied to all unit cells stacked for the implementation of a fuel cell stack, but it is preferable that the separators of different materials are applied to only unit cells disposed adjacent to the end plates in which corrosion occurs and excessive pressure is applied on the contact face. Here, it is preferable that the separators of different materials are applied to 10% or less of the total unit cells. This is because, in a region, which accounts for about 10% of the stack and is adjacent to the end plates, mainly product water is accumulated and a side reaction in which $H_2O_2$ is produced rather than H2O occurs such that the region is more exposed to the corrosion-inducing environment.

Meanwhile, a fuel cell stack of the present disclosure may be configured such that a shape of the separator is different from that of the fuel cell stack described above.

As illustrated in FIG. 4, a fuel cell stack according to another exemplary embodiment of the present disclosure is configured such that multiple unit cells are stacked as is the fuel cell stack described above. Each unit cell includes: a MEA 10; a pair of GDLs 20 disposed on opposite surfaces of the MEA 10; an anode-side separator 100 and a cathode-side separator 300 that are disposed to face each other between the MEA 10 and the pair of GDLs 20.

Here, as in the above-described exemplary embodiment, the anode-side separator 100 is disposed to come into contact with a GDL 20 of an anode side to guide the flow of the fuel gas. As illustrated in FIG. 4, the anode-side separator 100 is configured with multiple channels 105 guiding the flow of the fuel gas. Here, a flow of coolant is guided to flow to the opposite side of the flow of the fuel gas.

The cathode-side separator 300 is disposed to come into contact with a GDL 20 of a cathode side to guide the flow of air reacting with the fuel gas. The cathode-side separator 300 may be configured with porous bodies 320 disposed toward the GDLs 20 and a flat plate 310 supporting the porous bodies 320. The porous bodies 320 and the flat plate 310 of the cathode-side separator 300 are configured to have multiple channels 305 through which air flows. Here, it is preferable that the porous bodies 320 and the flat plate 310 are formed of the same material.

As in the above-described exemplary embodiment, the porous bodies 320 and the flat plate 310 constituting the cathode-side separator 300 is required to have excellent corrosion resistance compared with the anode-side separator 100. Accordingly, in this exemplary embodiment, a metal constituting the porous bodies 320 and the porous bodies 320 has excellent corrosion resistance compared with a metal constituting the anode-side separator 100.

In addition, the anode-side separator 100 is required to have a thermal expansion coefficient greater than that of the porous bodies 320 and the porous bodies 320. Accordingly, in this exemplary embodiment, the metal constituting the anode-side separator 100 has a thermal expansion coefficient greater than the metal constituting the porous bodies 320 and the porous bodies 320.

For example, the anode-side separator 100 is formed of austenitic stainless steel (300 series stainless steel) having a relatively great thermal expansion coefficient and the porous bodies 320 and the flat plate 310 are formed of ferritic stainless steel (400 series stainless steel) having relatively excellent corrosion resistance.

The fuel cell stack according to the exemplary embodiments of the present disclosure configured as described above will be described in comparison with Comparative Example.

According to the Example, a fuel cell stack was manufactured such that an anode-side separator was made of SUS 304, which is a 300 series stainless steel having a relatively high thermal expansion coefficient, and a cathode-side separator was made of SUS 410, which is a 400 series stainless steel having a relatively low thermal expansion coefficient. On the other hand, according to the Comparative Example, a fuel cell stack was configured such that an anode-side separator and a cathode-side separator were made of SUS 410, which has a relatively low thermal expansion coefficient.

Figure 5A:
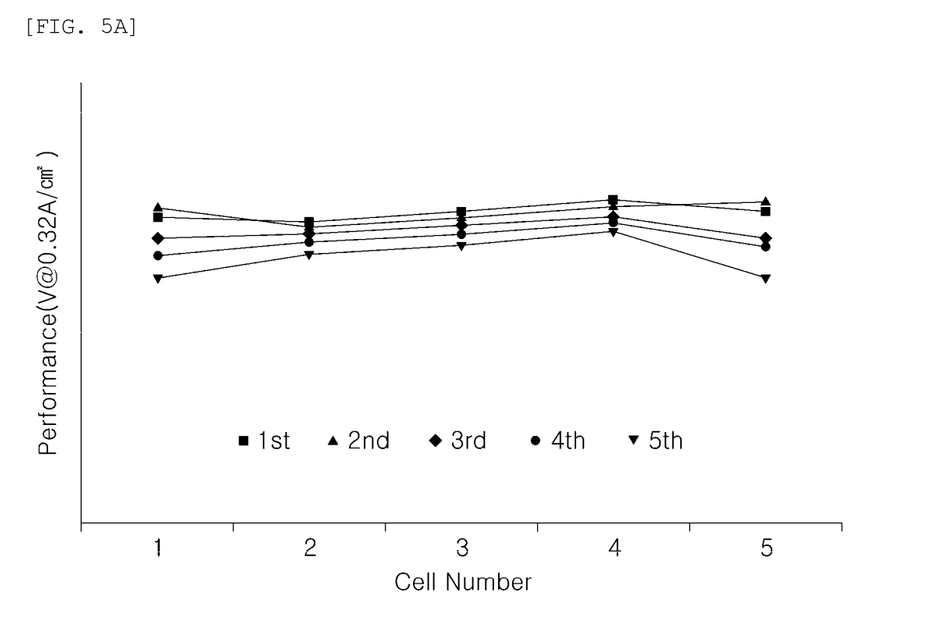
FIG. 5A is a graph illustrating a result of measuring stack performance five times for a fuel cell according to Example.
Figure 5B:
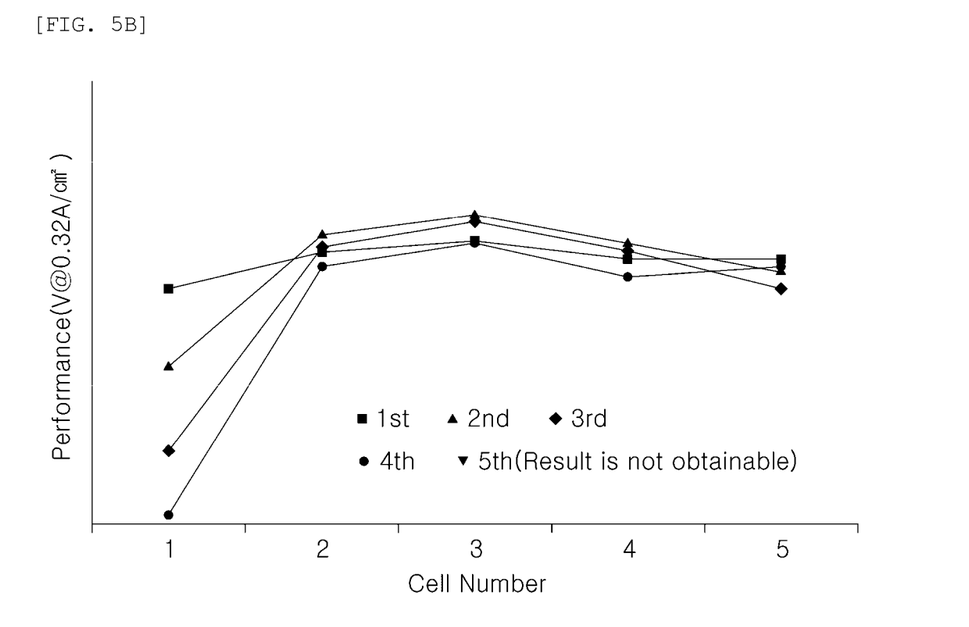
FIG. 5B is a graph illustrating a result of measuring stack performance five times for a fuel cell stack according to Comparative Example.

Stack performance was measured five times for each of the prepared fuel cell stacks of the Example and the Comparative Example, and the results are illustrated in FIGS. 5A and 5B. FIG. 5A is the result of the fuel cell stack of the Example and FIG. 5B is the result of the fuel cell stack of the Comparative Example. Cell numbers were sequentially numbered from a unit cell adjacent to an end plate.

FIG. 5A, shows a result of the test performed five times on the fuel cell stack of the Example, wherein the performance of all the unit cells tended to decrease slightly with each subsequent test. However, it was confirmed that the stack performance was mostly uniform in all the unit cells. FIG. 5B shows a result of the test performed five times on the fuel cell stack of the Comparative Example, wherein the performance of all the unit cells tended to decrease with each subsequent test. In particular, it was confirmed that the stack performance was degraded remarkably with each subsequent test for a unit cell disposed in a region close to the end plate.

Figure 6:
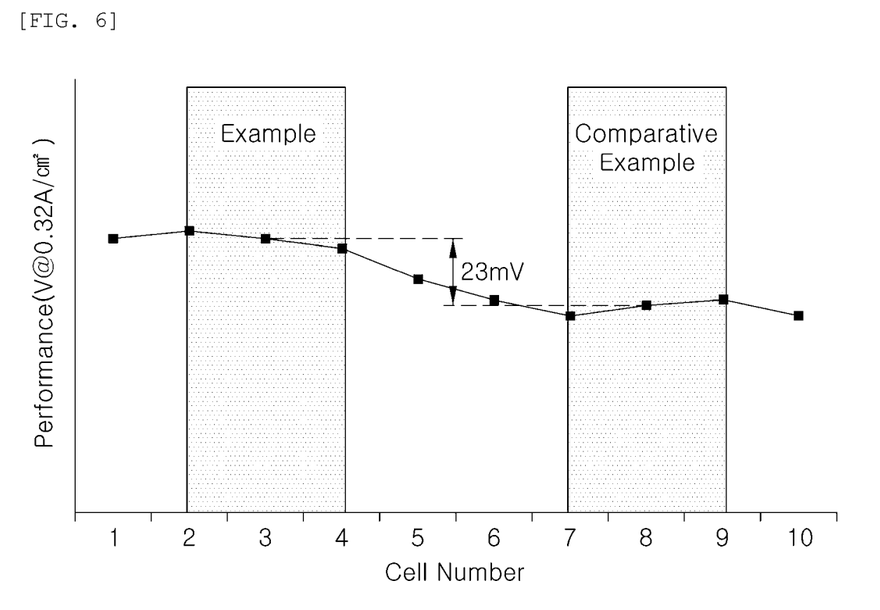
FIG. 6 is a graph illustrating a result of measuring performance of a stack in which unit cells including separators prepared according to Example and Comparative Example are stacked in one single stack.

Next, unit cells having the separators prepared according to the Example and the Comparative Example were stacked together to configure one single stack, and performance of the stack was measured. The results are illustrated in FIG. 6. Here, unit cells numbered 1 to 10 were stacked whereby cell numbers 1 to 5 were unit cells having the separators prepared according to the Example, and cell numbers 6 to 10 were unit cells having the separators prepared according to the Comparative Example.

As illustrated in FIG. 6, it was confirmed that the stack performance of the unit cells having the separators prepared according to the Example was excellent compared with the unit cells having the separators prepared according to the Comparative Example, even in the one single stack.

Next, voltage values of a stack in which unit cells having the separators prepared according to the Example were stacked and of a stack in which unit cells having the separators prepared according to the Comparative Example were stacked were measured with respect to current density. The results are illustrated in FIG. 7.

Figure 7:
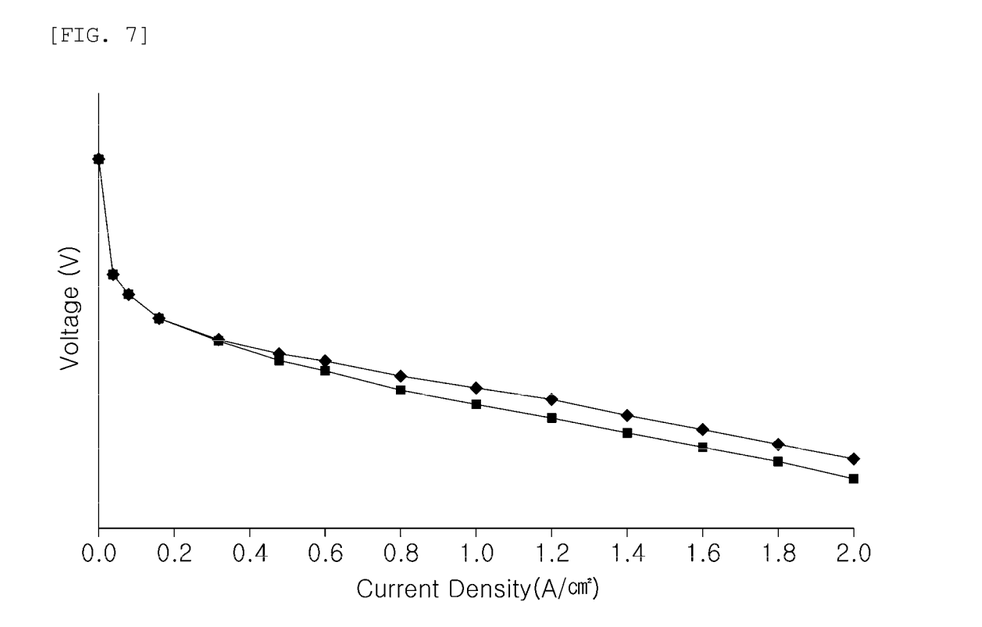
FIG. 7 is a graph illustrating a result of measuring voltage values of a stack including unit cells stacked therein and having the separators prepared according to the Example and voltage values of a stack including unit cells stacked therein and having the separators prepared according to the Comparative Example, with respect to current density.

As illustrated in FIG. 7, it was confirmed that the voltage values of the Example were higher than those of the Comparative Example in almost all current density ranges.

Accordingly, it was confirmed that when the anode-side separator and the cathode-side separator were made of materials having different thermal expansion coefficients as in the exemplary embodiments, the pressure applied to the contact face in the stack was prevented from being lowered such that the durability of the stack is maintained and the stack performance was excellent.

The foregoing descriptions of specific exemplary embodiments of the present disclosure have been presented for purposes of illustration and description. They are not intended to be exhaustive or to limit the inventive concept(s) to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the inventive concept(s) be defined by the Claims appended hereto and their equivalents.

What is claimed is:

1. A fuel cell stack having multiple unit cells stacked therein,
   wherein each unit cell of the multiple unit cells includes:
   a membrane electrode assembly (MEA);
   a pair of gas diffusion layers (GDLs) disposed on opposite surfaces of the MEA; and
   an anode-side separator and a cathode-side separator disposed to face each other, the MEA and the pair of GDLs being disposed therebetween,
   wherein each unit cell of the multiple unit cells includes the anode-side separator and the cathode-side separator having different corrosion resistances from each other,
   a metal constituting the cathode-side separator has a corrosion resistance higher than a metal constituting the anode-side separator, and
   the number of unit cells that include the anode-side separator and the cathode-side separator having different corrosion resistances from each other is more than or equal to one unit cell and less than or equal to 10% of an entire number of the multiple unit cells.

2. The fuel cell stack of claim 1, wherein each unit cell of the multiple unit cells includes the anode-side separator and the cathode-side separator having different corrosion resistances from each other, and
   the anode-side separator has a thermal expansion coefficient greater than a thermal expansion coefficient of the cathode-side separator.

3. The fuel cell stack of claim 1, wherein each unit cell of the multiple unit cells includes the anode-side separator and the cathode-side separator having different corrosion resistances from each other, and
   the anode-side separator includes austenitic stainless steel and the cathode-side separator includes ferritic stainless steel.

4. The fuel cell stack of claim 1, wherein each unit cell of the multiple unit cells includes the anode-side separator and the cathode-side separator having different corrosion resistances from each other, and
   the anode-side separator includes aluminum or aluminum alloy and the cathode-side separator includes titanium or titanium alloy.

5. The fuel cell stack of claim 1, wherein the anode-side separator is configured with multiple channels guiding flows of fuel gas and coolant, and
   the cathode-side separator is configured with multiple channels guiding flows of air and the coolant.

6. The fuel cell stack of claim 1, wherein the anode-side separator is configured with multiple channels guiding flows of fuel gas and coolant, and
   the cathode-side separator is configured with porous bodies disposed toward the GDLs and a flat plate supporting the porous bodies, wherein the porous bodies and the flat plate of the cathode-side separator are configured to have multiple channels through which air flows, and wherein the porous bodies and the flat plate include a same material.

* * * * *